(12) United States Patent  (10) Patent No.: US 7,661,741 B2
Takai  (45) Date of Patent: Feb. 16, 2010

(54) IN-VEHICLE STORAGE UNIT

(75) Inventor: Shirena Takai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/125,379

(22) Filed: May 22, 2008

(65) Prior Publication Data

US 2008/0290681 A1  Nov. 27, 2008

(30) Foreign Application Priority Data

May 24, 2007  (JP)  ............................. 2007-137830

(51) Int. Cl.
*B60R 7/04* (2006.01)
(52) U.S. Cl. ..................................... 296/37.1; 296/37.7
(58) Field of Classification Search ................ 296/37.1, 296/37.7, 37.8, 37.12
See application file for complete search history.

(56) References Cited

U.S. PATENT DOCUMENTS

| | | | |
|---|---|---|---|
| 5,775,761 A | * | 7/1998 | Asami et al. ............... 296/37.7 |
| 6,062,623 A | * | 5/2000 | Lemmen .................... 296/37.8 |
| 6,789,831 B2 | * | 9/2004 | Schmidt et al. .......... 296/37.13 |
| 7,055,883 B2 | * | 6/2006 | Tokutomi et al. .......... 296/37.8 |

FOREIGN PATENT DOCUMENTS

JP   9-169245   6/1997

* cited by examiner

*Primary Examiner*—Dennis H Pedder
*Assistant Examiner*—Pinel E Romain
(74) *Attorney, Agent, or Firm*—Rankin, Hill & Clark LLP (57) ABSTRACT

An in-vehicle storage unit includes a base member adapted to be fixed to a vehicle body and having an opening portion, a case which is openable and closable with respect to the opening portion, a pivot via which the case is rotatably supported by the base member, a gear disposed on a side wall of the case, the gear being an arc-shape having a center at the pivot, and a damper disposed on the base member. The damper is engaged with the gear to provide a damping force to the case when the case rotates from a closed position, at which the case is closed with respect to the opening portion, to an open position, at which the case is opened with respect to the opening portion. When the case is at the open position, the gear is disposed within an inner space of the base member.

14 Claims, 8 Drawing Sheets

IN-VEHICLE STORAGE UNIT

CROSS-REFERENCE TO RELATED APPLICATION(S)

The present application claims priority from Japanese Patent Application No. 2007-137830 filed on May 24, 2007, the entire content of which is incorporated herein by reference.

FIELD OF THE INVENTION

The present invention relates to an in-vehicle storage unit which is disposed, for example, in a roof portion of a vehicle interior.

DESCRIPTION OF THE RELATED ART

Some vehicles, such as automobiles, has a storage unit in a roof portion of a vehicle interior for storing glasses therein for example. JP-A-09-169245 discloses such a related art storage unit having a box-shaped base member fixed to a vehicle body by utilizing a space between an interior material and a roof panel of a roof portion. The storage unit also has a case which is rotatably supported on side walls of the base member via pivots, so that the case is openable and closable with respect to an opening of the base member. An arch-shaped gear is provided on a side wall of the case, and a damper is provided on the base member so as to be engageable with the gear. The damper is operable to apply damping force to the case when opening the case from a closed position to an open position with respect to the opening of the base member. According to this configuration, the case is smoothly openable.

However, in the above-described related art, there is a disadvantage that an external appearance is deteriorated when the case is at the open position because the gear on the side wall of the case becomes visible from the outside. Furthermore, because the gear is visible from the outside, an aesthetic appearance of a vehicle interior is deteriorated if the visible portion of the gear becomes dirty due to dust or the like.

SUMMARY OF THE INVENTION

One or more exemplary embodiments of the present invention provide an in-vehicle storage unit in which a gear provided on a case cannot be seen from the outside.

According to one or more exemplary embodiment of the present invention, an in-vehicle storage unit includes a base member adapted to be fixed to a vehicle body and having an opening portion, a case which is openable and closable with respect to the opening portion of the base member, a pivot via which the case is rotatably supported by the base member, a gear disposed on a side wall of the case, the gear being an arc-shape having a center at the pivot, and a damper disposed on the base member. The damper is engaged with the gear to provide a damping force to the case when the case rotates from a closed position, at which the case is closed with respect to the opening portion, to an open position, at which the case is opened with respect to the opening portion. When the case is at the open position, the gear is disposed within an inner space of the base member.

According to the configuration described above, when the case is at the open position with respect to the base member, the gear provided on the side wall of the case is disposed within the inner space inside the opening portion of the base member. Therefore, the gear is not exposed to the outside on the side wall of the opened case.

Other aspects and advantages of the present invention will be apparent from the following description, the drawings and the claims.

DETAILED DESCRIPTION OF THE EXEMPLARY EMBODIMENTS

Hereinafter, exemplary embodiments of the invention will be explained with reference to the drawings. The following exemplary embodiments do not limit the scope of the invention.

Figure 1:
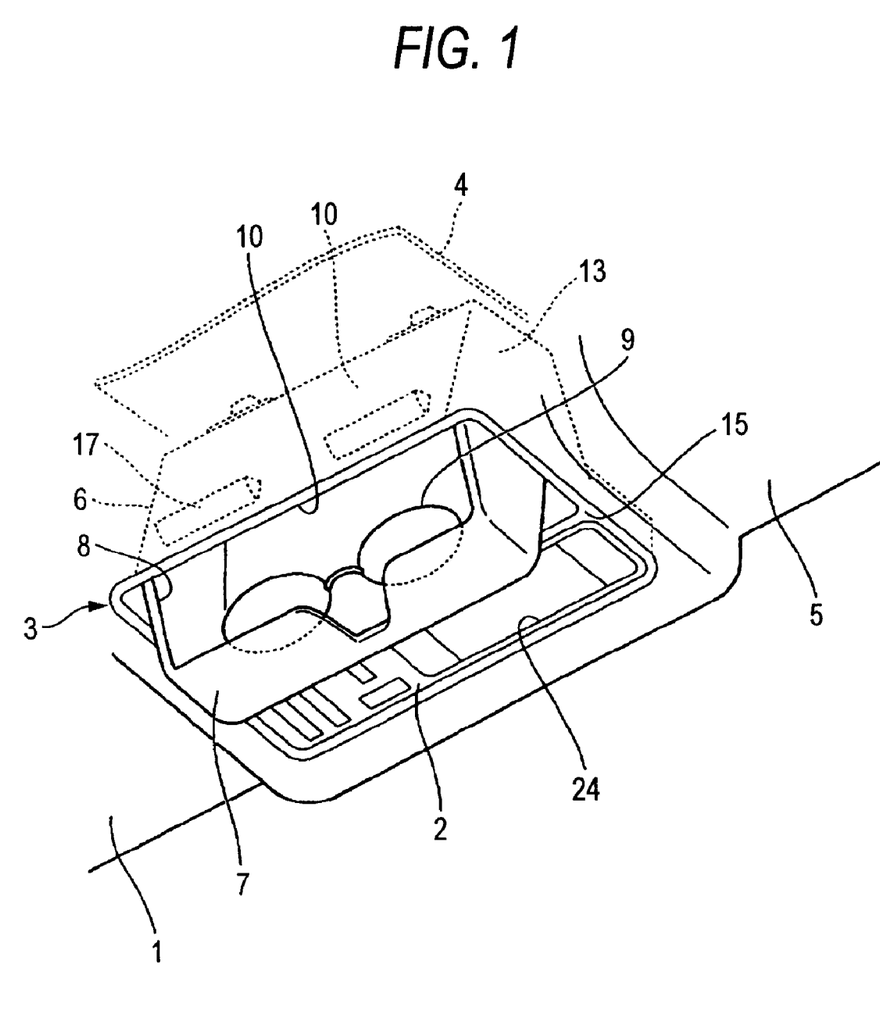
FIG. 1 is a perspective view of a storage unit, which is opened, according to an exemplary embodiment of the present invention.
Figure 2:
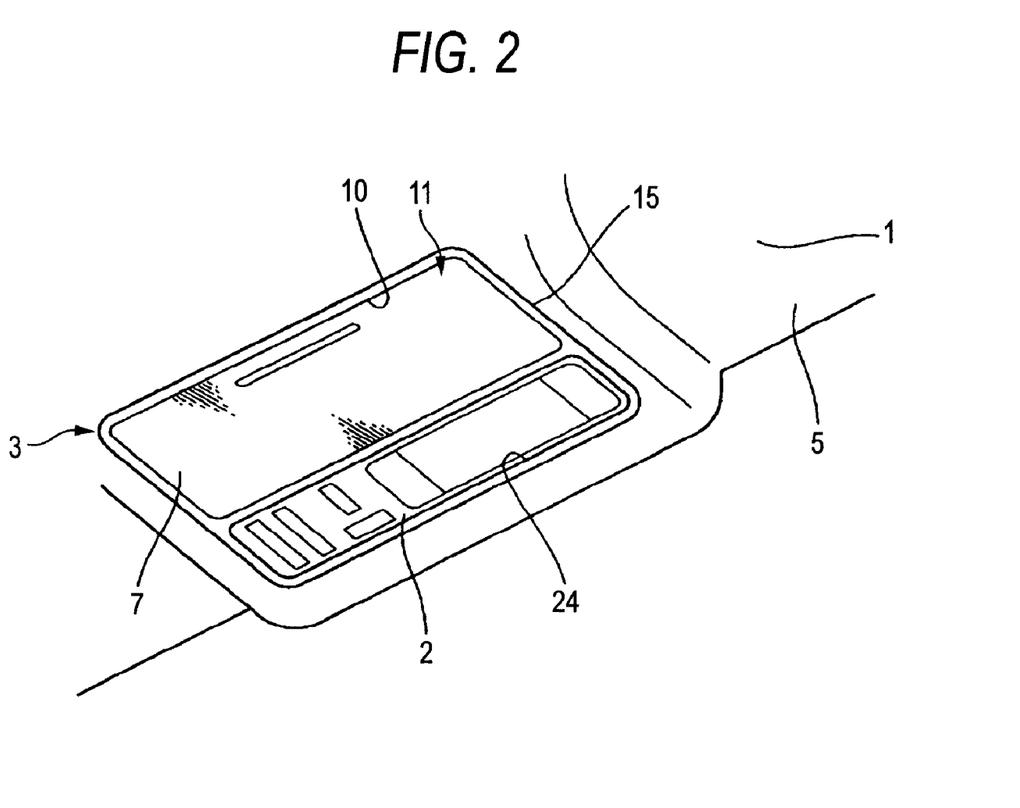
FIG. 2 is another perspective view of the storage unit which is closed.

As shown in FIGS. 1 and 2, a storage unit 3 is disposed in a front part of a roof portion 1 of a vehicle interior. The storage unit 3 may be arranged in a central portion of the roof portion 1 with respect to a vehicle width direction. The storage unit 3 is adapted to store, for example, glasses 9. The storage unit 3 includes a box-shaped base member 6, a case 7 which is rotatably supported inside the base member 6, and a room lamp device 2 which is disposed on a front part of the base member 6 adjacent to the case 7. The base member 6 is accommodated in a space provided between a roof front stiffener 4 and a leather cover 5. The roof front stiffener 4 is a portion of a vehicle body, and is arranged to extend in the vehicle width direction on an interior side of the front part of the roof portion 1.

As shown in FIG. 1, in an open position where a rear portion of the case 7 is forwardly and downwardly rotated with respect to the base member 6, a case opening portion 8 of the case 7 is opened rearwards so that the glasses 9 can be stored therein. As shown in FIG. 2, in a closed position where the case 7 is closed with respect to the base member 6, a base opening portion 10 of the base member 6 is closed by a bottom wall 11 of the case 7, whereby a lower part of the storage unit 3 becomes flat and the glasses 9 is accommodated inside the base member 6.

Figure 3:
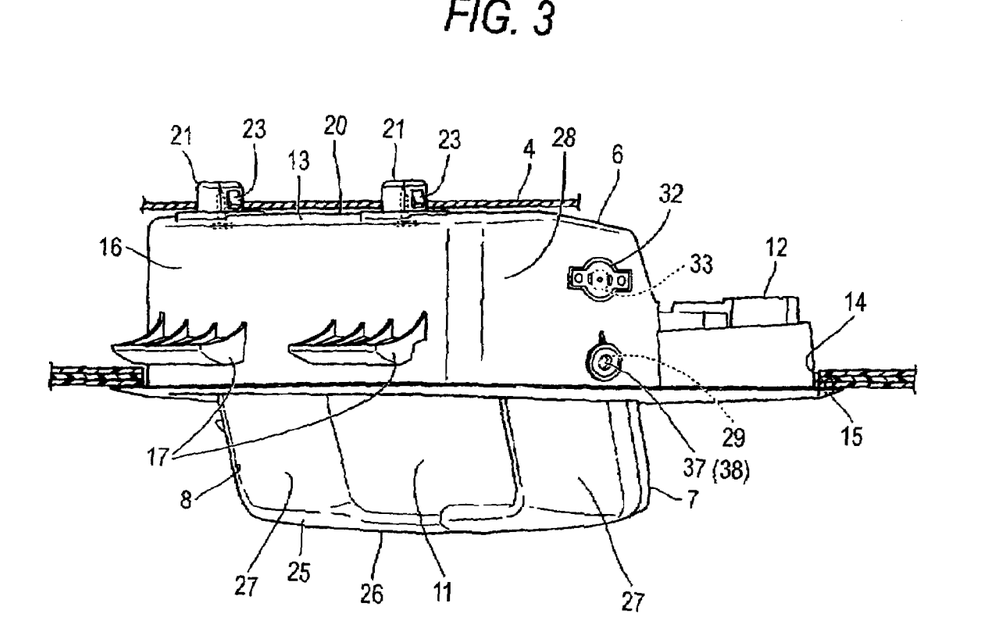
FIG. 3 is a perspective view which is seen obliquely from a front side and illustrating a case which is opened with respect to a base member.
Figure 4:
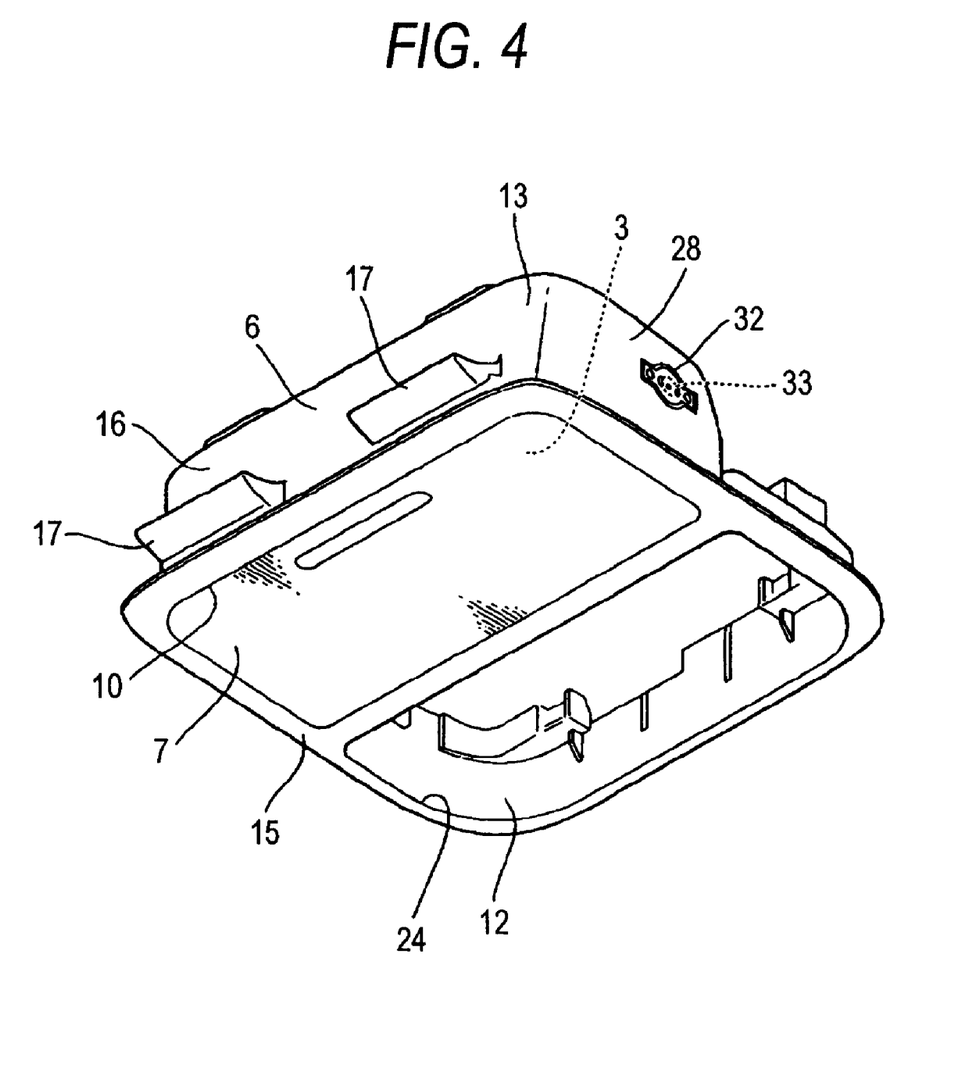
FIG. 4 is a perspective view which is seen obliquely from below and illustrating the case which is closed with respect to the base member.
Figure 5:
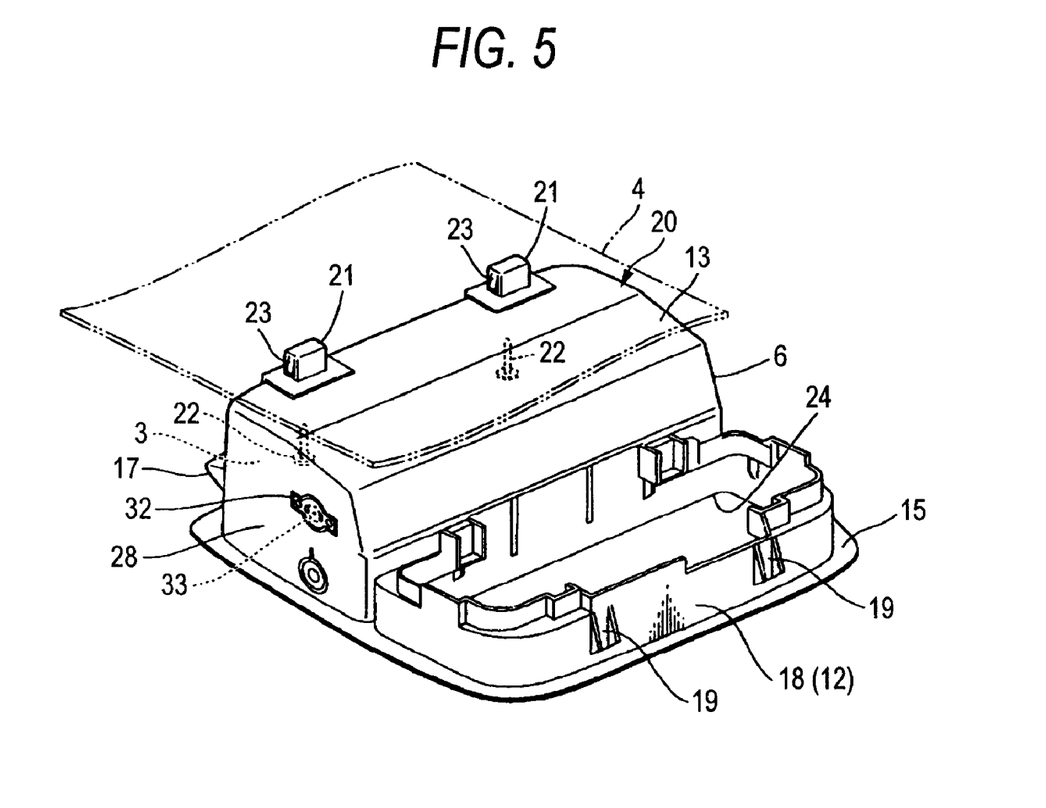
FIG. 5 is a perspective view of the base member which is seen obliquely from above.
Figure 7:
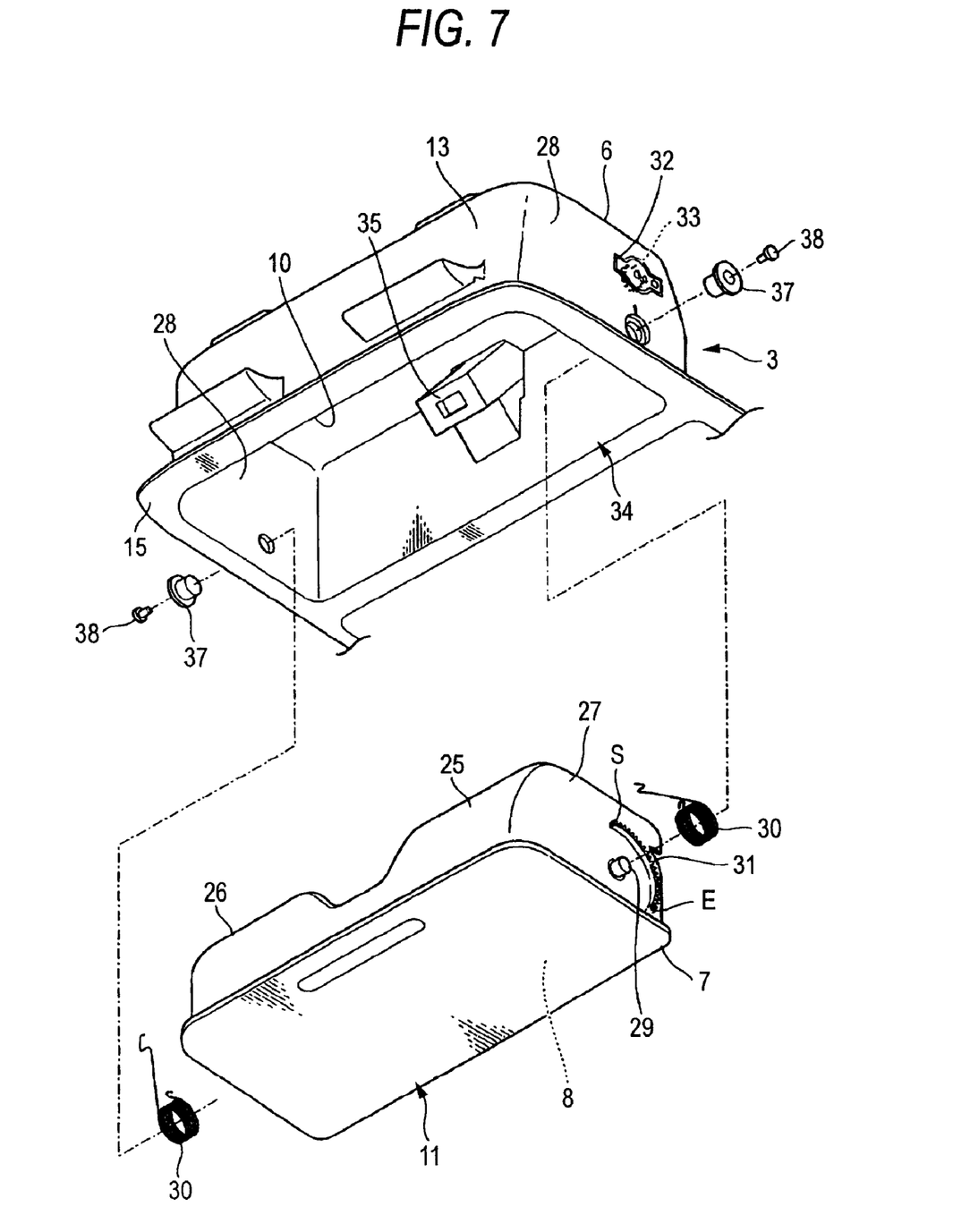
FIG. 7 is an exploded perspective view of the base member and the case.

As shown in FIGS. 4 and 7, the base opening 10 is formed on the lower part of the base member 6. As shown in FIGS. 3 to 5, the base member 6 includes a frame portion 12 to which the room lamp device 2 is attached. The frame portion 12 is integrally molded as a front part of the base member 6. The base member 6 further includes a storage recessed portion 13 which is bulged towards the roof front stiffener 4, and a flange portion 15 surrounding the frame portion 12 and the storage recessed portion 13. The flange portion 15 is configured to be in contact with a circumferential edge of a leather cover opening portion 14 of the leather cover 5 of the roof portion 1.

A pair of rear locking protrusions 17 is formed on a rear wall 16 of the base member 6. The rear locking protrusions 17 are engageable with the circumferential edge of the leather cover opening portion 14 such that the leather cover 5 of the roof portion 1 is held between the flange portion 15 and the rear locking protrusions 17. A pair of front locking protrusions 19 is formed on a front wall 18 of the flame portion 12. The front locking protrusions 19 are also engageable with the circumferential edge of the leather cover opening portion 14 such that the leather cover 5 of the roof portion 1 is held between the flange portion 15 and the front locking protrusions 19.

A pair of clips 21 is disposed along the vehicle width direction so as to protrude from a base wall 20 of the base member 6. Each of the clips 21 has locking pawls 23 which, by screwing a tapping screw 22 from an inner side of the case 7, outwardly open to engage with the roof front stiffener 4.

The frame portion 12 is formed with a frame opening portion 24 from which, when the room lamp device 2 is attached to the frame portion 12 as shown in FIGS. 1 and 2, lamps of the room lamp device 2 are exposed towards the inner side of the vehicle interior.

Figure 6:
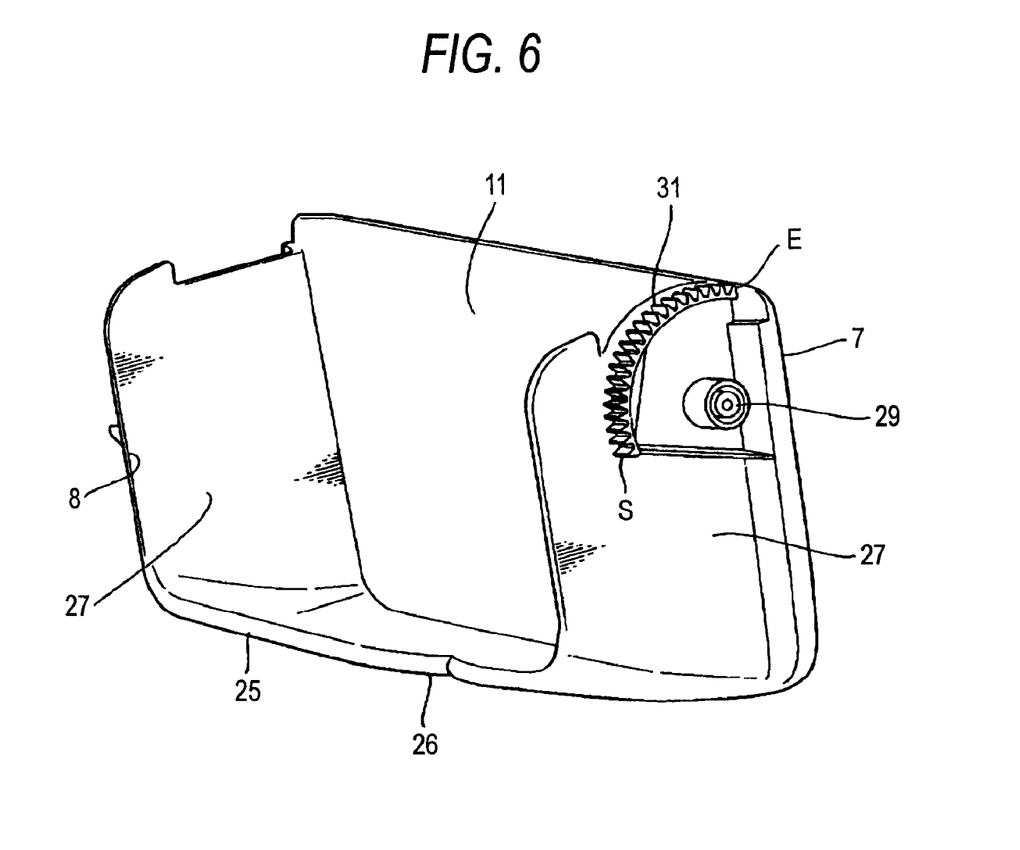
FIG. 6 is a perspective view of the case.

As shown in FIGS. 6 and 7, when the case 7 is at the closed position with respect to the base member 6, an upper side and a front side of the case 7 is opened inside the case member 6. A rear wall 25 of the case 7 is smoothly inclined towards the rear, and a cut portion 26 is formed on a central portion of the rear wall 25 so as to follow a shape of a lower edge of the glasses 9. As described above, the bottom wall 11 of the case 7 is configured to close the opening portion 10 such that, when the case 7 is at the closed position with respect to the base member 6, the bottom wall 11 is flush with a surface of the roof portion 1, in order to match with the surroundings.

Pivots 29 are provided on respective side walls 27 of the case 7, and are rotatably supported on side walls 28 of the base member 6. As shown in FIG. 7, each of the pivots 29 is supported on a front part of a lower portion of the corresponding one of the side walls 28 of the base member 6 with a resin bush 37 and a screw 38, and is rotatable with respect to the corresponding one of the side walls 28 of the base member 6 via a torsion spring 30 which biases the case 7 to the open position.

An external sector gear 31 is provided on one of the side walls 27 of the case 7, and is formed in an arc-shape around the corresponding one of the pivots 29. More specifically, the sector gear 31 is disposed on a portion of the side wall 27 where it is kept inside the base opening portion 10 even when the case 7 is at the open position with respect to the base member 6. In other words, the portion of the side wall 27, on which the sector gear is provided, overlaps, or faces the side wall 28 of the base member 6 even when the case 7 is at the open position.

A viscous resistance damper 32 is provided on one of the side walls 28 of the base member 6 such that a pinion 33 of the viscous resistance damper 32 protrudes toward the inner side of the side wall 28 to engage with the sector gear 31 on the case 7. Accordingly, while the case 7 is being rotated from the closed position to the open position due to a restoration force of the torsion spring 30, the viscous resistance damper 32 exerts a moderate damping force on a rotational motion of the case 7.

The sector gear 31 on the case 7 is formed such that, when case 7 is at the closed position with respect to the base member 6, the sector gear 31 extends from a starting point S above the pivot 29 to an ending point E on a front side of the pivot 29, over a range of about 90 degrees. The starting point S of the sector gear 31 is set at a position where the starting point S is concealed within the interior of the base member 6 even when the case 7 is at the open position with respect to the base member 6. Of course, the sector gear 31 cannot be seen from the outside when the case 7 is at the closed position with respect to the base member 6.

Figure 8:
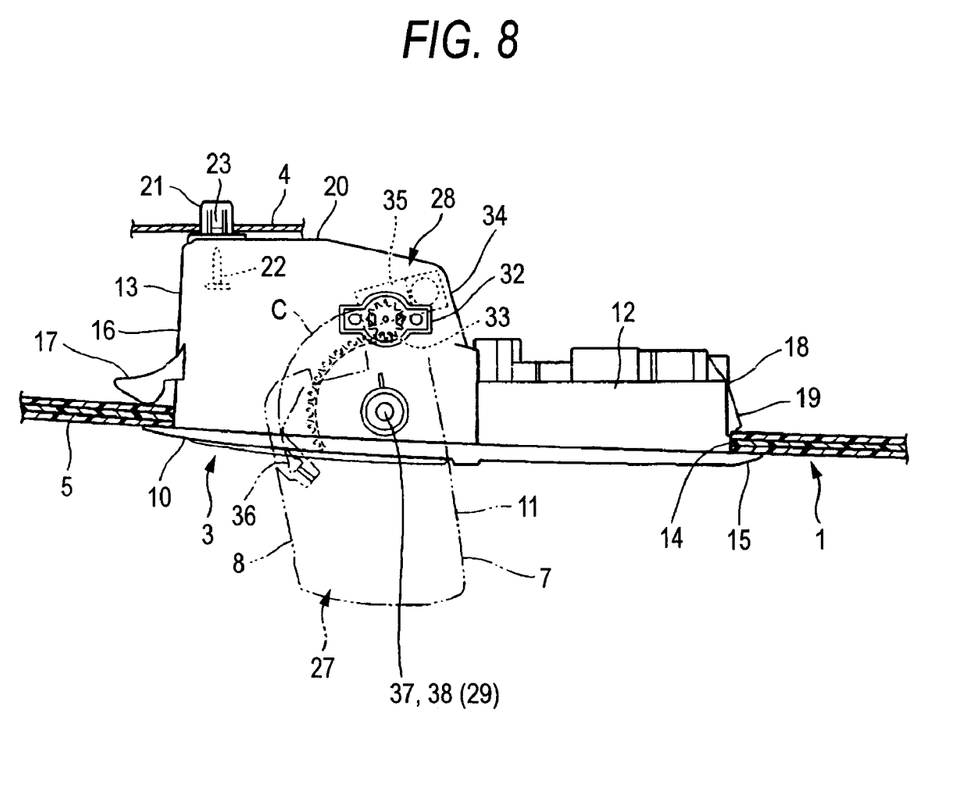
FIG. 8 is a side view showing a movement of the case.

A latch mechanism 35 is provided at a boundary area between a front wall 34 and the base wall 20 of the base member 6 at a central portion with respect to the vehicle width direction. The latch mechanism 35 is configured to hold the case 7 at the closed position. As shown in FIG. 8, an engagement projection 36, which is engageable with the latch mechanism 35 on the base member 6, is provided on the case 7 on an arc C having a center at the pivot 29.

The latch mechanism 35 is an alternate latch to which a heart cam mechanism is applied. More specifically, the latch mechanism 35 is configured such that the latch mechanism 35 locks the engagement projection 36 to hold the case 7 when the case 7 is at the closed position. However, when the case 7 is pushed and rotated further to the inner side from the closed position, the engagement of the latch mechanism 35 with the engagement projection 36 is released, so that the case 7 is allowed to rotate to the open position. Instead of the above configuration, the latch mechanism 35 may be provided on the case 7, and the engagement projection 36 may be mounted on the base member 6.

According to the exemplary embodiment, when the case 7 is at the closed position with respect to the base member 6 as shown in FIG. 2, the bottom wall 11 of the case 7 is flush with the roof portion 1, i.e., the case 7 does not projects into the vehicle interior. Thus, appearance of the vehicle interior is not deteriorated. When the rear portion of the bottom wall 11 of the case 7 is upwardly pushed from this state, the engagement projection 36 on the case 7 pushes the latch mechanism 35 to the inner side so that the engagement between the latch mechanism 35 and the engagement projection 36 is released, whereby the case 7 starts to rotate towards the open position due to the restoration force of the torsion spring 30.

Because the sector gear 31 on the case 7 engages with the pinions 33 of the viscous resistance dampers 32 on the base member 6, the case 7 rotates towards the open position smoothly and slowly. In addition, because the sector gear 31 has external teeth, a length along which the sector gear 31 of the case 7 meshes with the pinions 33 during a movement of the case 7 from the closed position to the open position is longer than a case in which an internal sector gear having internal teeth is used. As a result, an improved smoothness in the opening movement of the case 7 can be ensured.

When the case 7 reaches the open position as shown in FIG. 1, a rear half portion of the case 7 projects downwards from the surface of the roof portion 1 with the bottom wall 11 of the case 7 facing forward, a rear portion of the base opening portion 10 is opened downwards, and the case opening portion 8 is opened rearwards.

When the case 7 is at the open position in such a manner, the sector gear 31 cannot be seen from the outside because the sector gear 31 is disposed between the side wall 28 of the base member 6 and the side wall 27 of the case 7 on the inner side of the opening portion 10. Thus, thus aesthetic appearance of the vehicle interior is not deteriorated. In addition, it is also advantageous in that the sector gear 31 hardly becomes dirty because the sector gear 31 is not exposed to the outside.

After placing the glasses 9 inside the case 7 from the case opening portion 8, the case 7 can be returned to the closed position by pulling the lower portion of the bottom wall 11 of the case 7 and rotating the case 7 until the engagement projection 36 on the case 7 engages with the latch mechanism 35 on the base member 6.

When attaching the storage unit 3 into the roof portion 1 inside the vehicle, the base member 6 and the case 7 are assembled together in advance, and the base member 6 is preliminary attached to the leather cover 5 of the roof portion 1 by holding the leather cover 5 between the flange portion 15 and the front and rear locking protrusions 17, 19 of the base member 6. Then, when attaching the leather cover 5 to the roof portion 1 of the vehicle body, the clips 21 on the base wall 20 of the base member 6 are inserted into holes, not shown, of the roof front stiffener 4 and the tapping screws 22 are tightened from the inner side of the vehicle interior, whereby the locking pawls 23 of the respective clips 21 are opened are engaged with the roof front stiffener 4 near the not-shown holes. Accordingly, the base member 6 and the case 7 can be attached to the vehicle body together with the leather cover 5, so that efficiency of the assembling work is enhanced.

In the above described exemplary embodiment, the base member 6 includes the frame portion 12 to which the room lamp device 2 is attachable. However, according to another exemplary embodiment of the present invention, the room lamp device 2 may not be included in the storage unit 3. Further, according to another exemplary embodiment, the base member 6 may be attached to a portion other than the front part of the roof portion of the vehicle body.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. An in-vehicle storage unit comprising:
   a base member adapted to be fixed to a vehicle body and having an opening portion, said base member having a plurality of walls that cooperate to define an inner space of the base member;
   a case which is openable and closable with respect to the opening portion of the base member;
   a pivot disposed within said inner space via which the case is rotatably supported by the base member;
   a gear disposed on a side wall of the case and received within said inner space, the gear being arc-shaped and having a center at the pivot; and
   a damper disposed on the base member and extending into said inner space so as to engage the gear to provide a damping force to the case when the case rotates from a closed position, at which the case is closed with respect to the opening portion, to an open position, at which the case is opened with respect to the opening portion,
   wherein, when the case is at the open position, the gear is disposed entirely within the inner space of the base member.

2. The in-vehicle storage unit according to claim 1, further comprising a room lamp device,
   wherein the base member comprises a frame portion to which the room lamp device is attached.

3. The in-vehicle storage unit according to claim 1, wherein the base member comprises a flange portion and a locking protrusion disposed above the flange portion,
   wherein the flange portion and the locking protrusion are adapted to hold an interior material, which is to be arranged on an inner side of the vehicle body, therebetween.

4. The in-vehicle storage unit according to claim 1, wherein the base member comprises a locking portion which is engageable with the vehicle body.

5. The in-vehicle storage unit according to claim 1, wherein the damper is disposed above the pivot.

6. The in-vehicle storage unit according to claim 2, wherein the base member further comprises a flange portion surrounding the opening portion and the frame portion, and a locking protrusion disposed above the flange portion,
   wherein the flange portion and the locking protrusion are adapted to hold an interior material, which is to be arranged on an inner side of the vehicle body, therebetween.

7. The in-vehicle storage unit according to claim 3, further comprising a tapping screw,
   wherein the base member comprises a locking portion which is engageable with the vehicle body when the tapping screw is fastened into the locking portion from an inner side of the base member.

8. An in-vehicle storage unit, comprising:
   a base member adapted to be fixed to a vehicle body and having an opening portion that is surrounded by a flange portion on three sides, said base member having a plurality of walls that cooperate to define an inner space of the base member;
   a case with an outer perimeter that is received within the flange portion of the base member, wherein the case is openable and closable with respect to the opening portion of the base member;
   a pivot disposed within the inner space via which the case is rotatably supported by the base member;
   a gear disposed on a side wall of the case and received within the inner space, the gear being arc-shaped starting at a point S and ending at a point E, the gear having a center at the pivot; and
   a damper disposed on the base member and extending into the inner space so as to engage the gear to provide a damping force to the case when the case rotates from a closed position, at which the case is closed with respect to the opening portion and the damper is engaging point S of the gear, to an open position, at which the case is opened with respect to the opening portion and the damper is engaging point E of the gear,
   wherein, when the case is at the open position, the gear is disposed entirely within the inner space of the base member.

9. The in-vehicle storage unit according to claim 8, further comprising a room lamp device,
   wherein the base member comprises a frame portion to which the room lamp device is attached.

10. The in-vehicle storage unit according to claim 8, wherein the base member comprises the flange portion and a locking protrusion disposed above the flange portion,
    wherein the flange portion and the locking protrusion are adapted to hold an interior material, which is to be arranged on an inner side of the vehicle body, therebetween.

11. The in-vehicle storage unit according to claim 8, wherein the base member comprises a locking portion which is engageable with the vehicle body.

12. The in-vehicle storage unit according to claim 8, wherein the damper is disposed above the pivot.

13. The in-vehicle storage unit according to claim 9, wherein the base member further comprises the flange portion surrounding the opening portion and the frame portion, and a locking protrusion disposed above the flange portion,
    wherein the flange portion and the locking protrusion are adapted to hold an interior material, which is to be arranged on an inner side of the vehicle body, therebetween.

14. The in-vehicle storage unit according to claim 10, further comprising a tapping screw,
wherein the base member comprises a locking portion which is engageable with the vehicle body when the tapping screw is fastened into the locking portion from an inner side of the base member.

* * * * *